United States Patent
Lee et al.

(10) Patent No.: US 9,424,870 B2
(45) Date of Patent: Aug. 23, 2016

(54) POSITION ERROR SIGNAL COMPENSATION TO PREVENT ADJACENT TRACK ERASURE

(71) Applicant: Seagate Technology LLC, Cupertino, CA (US)

(72) Inventors: SangHyub Lee, Suwon (KR); JungWook Hur, Suwon (KR); YoChan Cho, HwaSung (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/567,873

(22) Filed: Dec. 11, 2014

(65) Prior Publication Data

US 2016/0171996 A1 Jun. 16, 2016

(51) Int. Cl.
*G11B 5/596* (2006.01)
*G11B 19/04* (2006.01)
*G11B 20/12* (2006.01)

(52) U.S. Cl.
CPC .......... *G11B 5/59627* (2013.01); *G11B 19/045* (2013.01); *G11B 20/12* (2013.01)

(58) Field of Classification Search
CPC ........ G11B 5/596; G11B 5/56; G11B 19/045; G11B 20/12; G11B 20/1217; G11B 5/012
USPC ......... 360/45, 48, 75, 55, 77.04, 77.05, 77.08
See application file for complete search history.

(56) References Cited

U.S. PATENT DOCUMENTS

| | | | |
|---|---|---|---|
| 6,493,173 B1 | 12/2002 | Kim et al. | |
| 6,600,621 B1 * | 7/2003 | Yarmchuk | G11B 5/59627 360/75 |
| 6,608,731 B2 * | 8/2003 | Szita | G11B 5/59633 360/75 |
| 7,019,939 B2 | 3/2006 | Kusumoto et al. | |
| 7,286,313 B2 * | 10/2007 | Erden | G11B 5/59627 360/39 |
| 7,336,438 B2 | 2/2008 | Park et al. | |
| 8,699,162 B1 | 4/2014 | Grobis et al. | |
| 8,896,959 B1 * | 11/2014 | Kashiwagi | G11B 5/56 360/55 |
| 2006/0139790 A1 * | 6/2006 | Iseri | G11B 5/5582 360/75 |
| 2012/0162814 A1 * | 6/2012 | Kimizuka | G11B 5/012 360/75 |
| 2012/0307400 A1 * | 12/2012 | Kawabe | G11B 5/59627 360/77.01 |
| 2013/0027806 A1 | 1/2013 | Cho | |
| 2014/0118857 A1 * | 5/2014 | Kashiwagi | G11B 5/596 360/75 |

* cited by examiner

*Primary Examiner* — Thomas Alunkal
(74) *Attorney, Agent, or Firm* — Taylor English Duma LLP

(57) ABSTRACT

Technologies are described herein for preventing adjacent track erasure in a storage device using position error signal compensation from a previously written track in a storage device. A first data track is written to a recording medium in the storage device while position error signal information regarding deviations of a read/write head from an ideal center of the first data track are recorded. The recorded position error signal information is then utilized during the writing of a second, adjacent data track to the recording medium to position the read/write head in order to compensate for non-uniformities in the writing of the first data track.

12 Claims, 6 Drawing Sheets

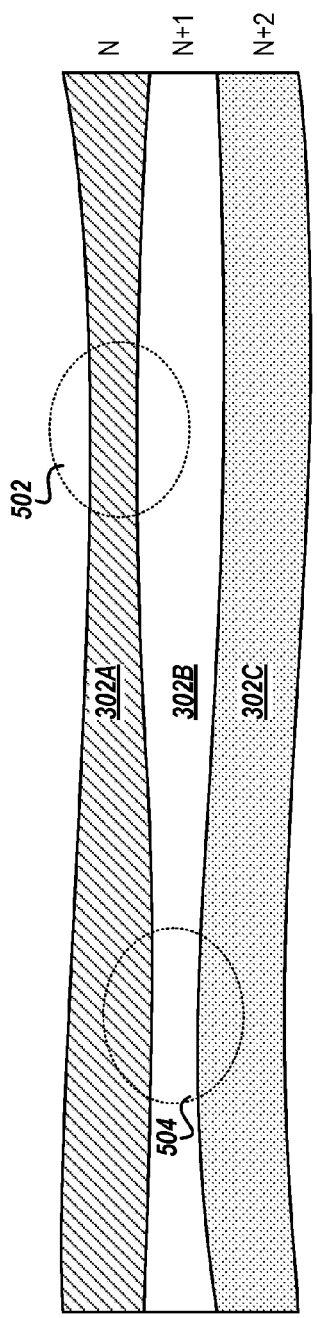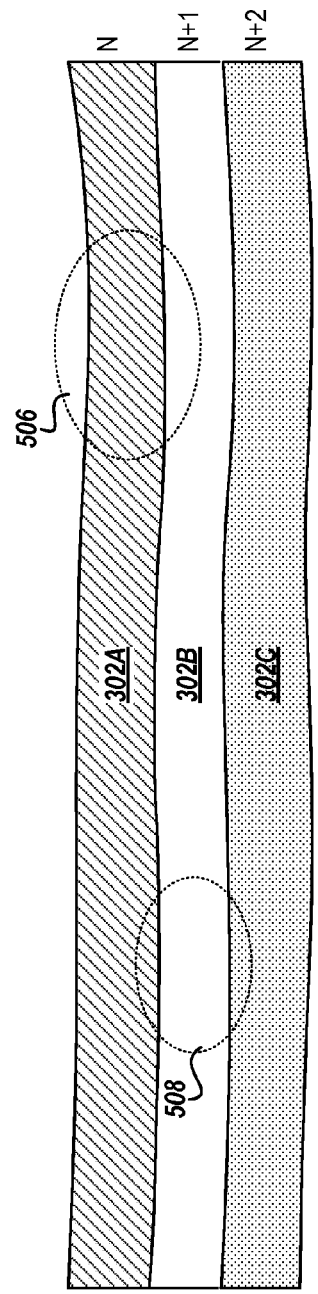

POSITION ERROR SIGNAL COMPENSATION TO PREVENT ADJACENT TRACK ERASURE

BRIEF SUMMARY

The present disclosure relates to technologies for preventing adjacent track erasure in a storage device using position error signal compensation. According to some embodiments, a method comprises writing a first data track to a recording medium in a storage device while recording position error signal information regarding deviations of a read/write head from an ideal center of the first data track. The recorded position error signal information is then utilized during the writing of a second, adjacent data track to the recording medium to position the read/write head in order to compensate for non-uniformities in the writing of the first data track.

According to further embodiments, a storage device comprises a servo system for controlling an alignment of a read/write head with a target data track on a recording medium, a memory, and a processor operably connected to the memory and the servo system. The processor is configured to write a first data track to the recording medium and to receive position error signal information from the servo system regarding deviations of the read/write head from an ideal center of the first data track. The processor stores the position error signal information in the memory, and then writes a next data track to the recording medium using the stored position error signal information to compensate for non-uniformity in the writing of the first data track.

According to further embodiments, a computer-readable medium has processor-executable instructions stored thereon that, when executed by a processor in a storage device, cause the processor to write a first data track in an SMR band to a recording medium of the storage device while recording position error signal information regarding deviations of a read/write head from an ideal center of the first data track. The processor then writes the next data track in the SMR band to the recording medium using the recorded position error signal information to position the read/write head.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

FIGS. 5A and 5B are block diagrams illustrating details of adjacent track erasure in shingled magnetic recording and its prevention using position error signal compensation, according to embodiments described herein.

DETAILED DESCRIPTION

The following detailed description is directed to technologies for preventing adjacent track erasure in a storage device, such as a hard-disk drive ("HDD") device, using position error signal information from a previously written track. During the write operation of a data track on the recording media of an HDD, a repeatable runout ("RRO"), an external impact, or another anomaly may cause non-uniformity in the written track which may affect an adjacent track even if the write operation occurred within the bump limit of the track pitch. In cases where two adjacent tracks are written very close together, parts of an adjacent track may be erased or damaged by the track write operation, thus resulting in a write/read error. Such adjacent track erasure may be more prevalent in shingled magnetic recording ("SMR") where there is less spacing between adjacent tracks.

In a conventional HDD apparatus, the read/write heads are kept close to the ideal center of a target data track during the write operation by a servo mechanism. The read/write heads of the HDD apparatus read special magnetic patterns written to the recording media, referred to as "servo patterns" or "servo data," to produce a position error signal ("PES") representing a displacement of the read/write head from the center of the target track. The servo mechanism utilizes the PES in a closed-loop feedback system to align the head relative to the center of the target data track during the write. However, if an external impact or vibration occurs during the write, or an RRO or other anomaly on the recording medium causes an inconsistency in the servo patterns, a non-uniformity may introduced in the written data track. A subsequent data track written adjacent to the non-uniform track may invade and erase a portion of the previously written track.

According to the embodiments described herein, in order to avoid adjacent track erasure when writing subsequent tracks, the controller of the HDD apparatus is configured to use the PES information from of the previously written track to adjust the center of the next written track. For example, during sequential writing of a number adjacent tracks on the recording medium of an HDD, such as those in an SMR band write, the PES and bump limit information from a previous track write may be recorded and utilized in writing next track(s) in order to avoid erasure of the previously written track.

Figure 1:
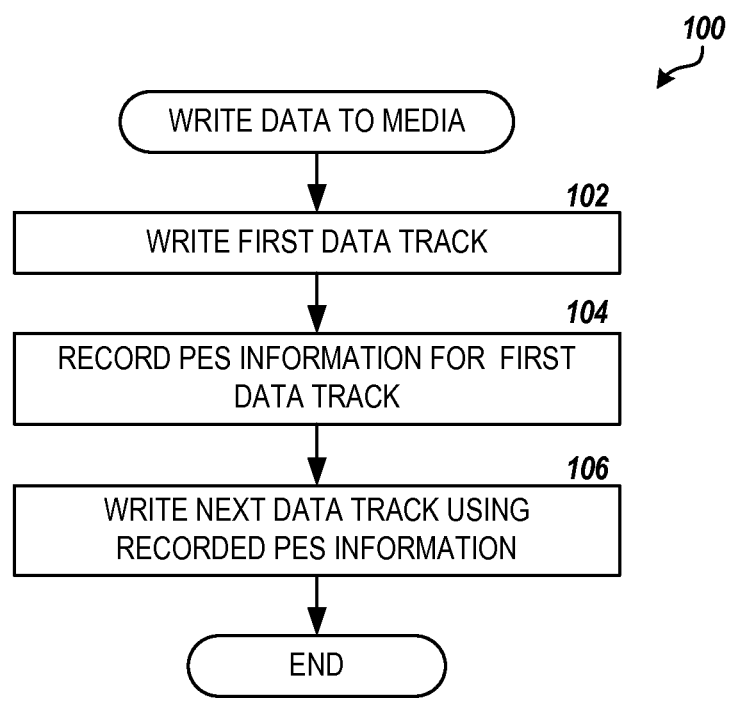
FIG. 1 is a flow diagram showing one routine for preventing adjacent track erasure in a storage device using position error signal information from a previously written track, according to embodiments described herein.

FIG. 1 illustrates a novel routine 100 for preventing adjacent track erasure in a storage device using position error signal compensation from a previously written track. According to some embodiments, the routine 100 may be performed by a controller of the storage device when performing a sequential write of two or more adjacent data tracks on the recording medium, such as in an SMR band write. The routine 100 includes step 102, where a first data track of the sequential write operation is performed. During the write of the first data track, the PES information generated by the servo data on the recording medium is recorded and stored in a memory, as shown at step 104. Next, at step 106, the recorded PES information is utilized to compensate for any non-uniformity in the first data track while writing the next data track in order to avoid erasure or damage to the data written to the first data track.

In some embodiments, when the recorded PES information indicates that the center of the first data track skews in the direction of the next track, the center position of the next track may be compensated (adjusted) to skew in a similar direction somewhat more than the natural center of the next track. A weighting factor may be applied to the PES information from the first track in determining the amount of compensation applied to the next data track. Further, compensation of a certain weight may be applied to tracks following the next track in the SMR band. From step 106, the routine 100 ends.

Figure 2:
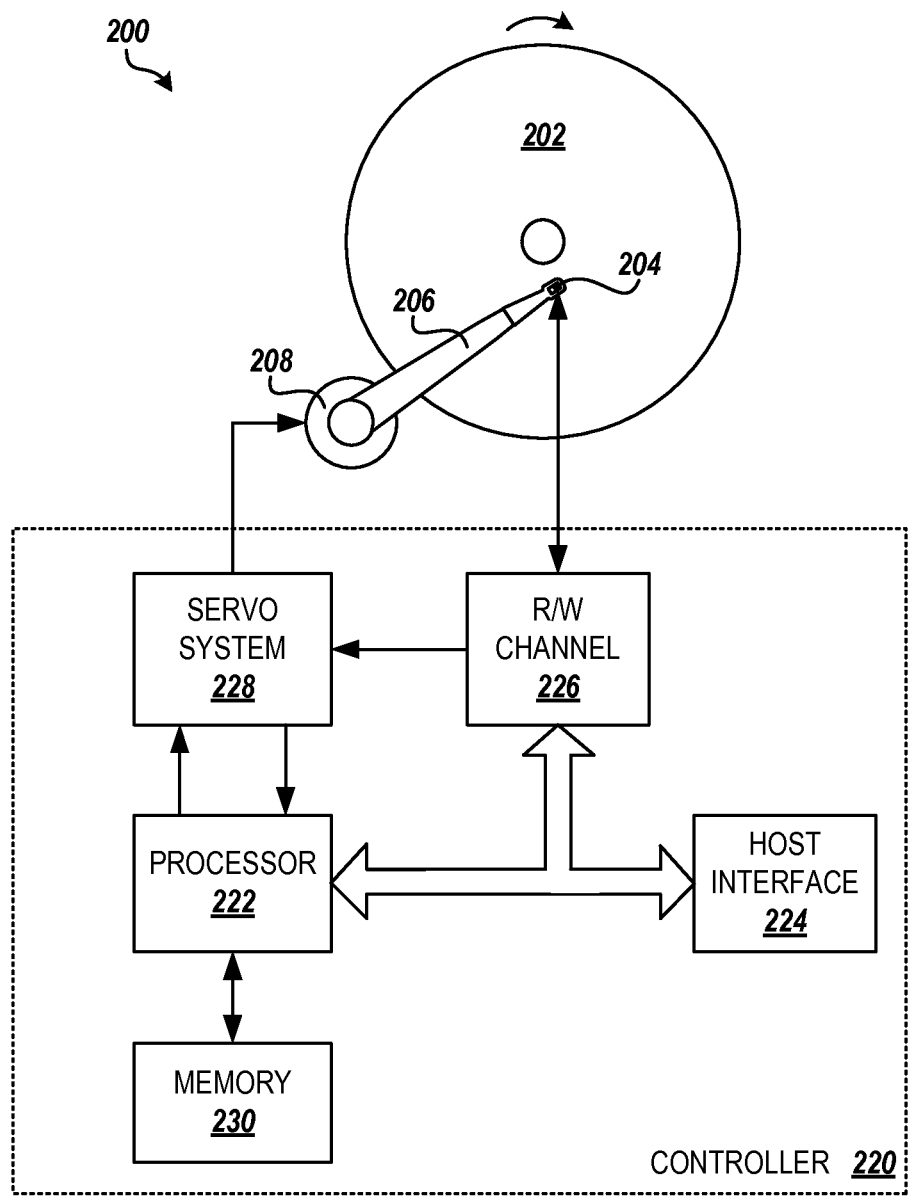
FIG. 2 is a block diagram showing an illustrative environment for preventing adjacent track erasure in a storage device using position error signal compensation in a storage device, according to embodiments described herein.
Figure 3:
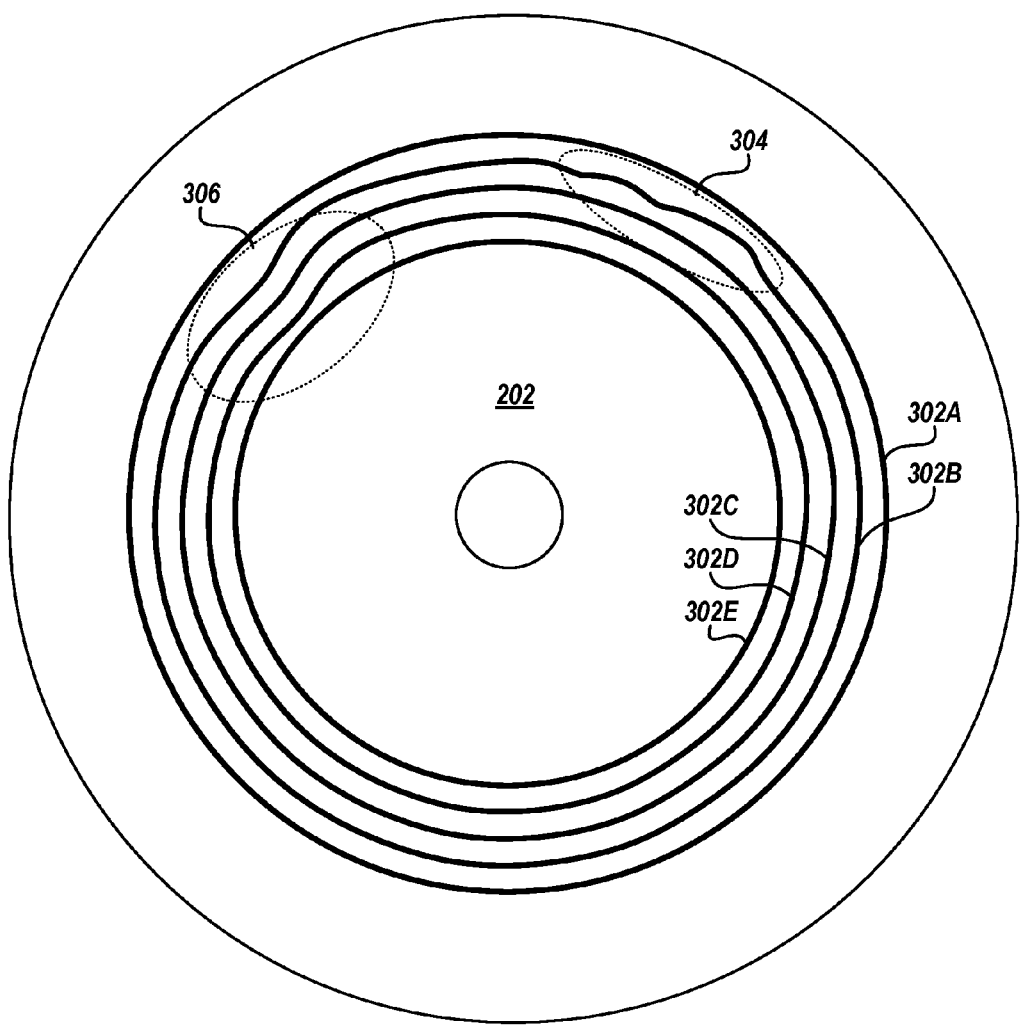
FIG. 3 is a block diagram showing an illustrative layout of data tracks on disk media, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for preventing adjacent track erasure in a storage device using position error signal compensation, according to the embodiments provided herein. The storage device 200 may include recording media comprising at least one platter or disk 202. The disk(s) 202 may include a magnetic recording surface divided or "formatted" into a number of individual data tracks, such as data tracks 302A-302E (referred to herein generally as data tracks 302) shown in FIG. 3. The data tracks 302 may represent substantially concentric circular areas on the surface of the disk 202.

However, because of factors such as platter shift, platter geometry irregularity, vertical and horizontal platter vibrations, air fluctuations, external shock and vibrations, and the like, each data track may not be perfectly circular but may contain track non-uniformities ("TNUs"). Deviation of the actual center of a data track from the ideal circular track is referred to as "runout." Deviations that result from irregular disk geometry, platter shift, surface anomalies, and other conditions in the storage device 200 are repeatable and are thus referred to as repeatable runout ("RRO"). Repeatable runout may affect a number of data tracks in a same radial position on the disk 202, such as data tracks 302B, 302C, and 302D shown at 306. Deviations that result from external shocks or vibration or other momentary events are referred to as non-repeatable runout ("NRO"). Non-repeatable runout may only affect the data track(s) being written at the time of the event, such as track 302B shown at 304.

Returning to FIG. 2, the storage device 200 further includes at least one read/write head 204 located adjacent to the recording surface of each disk 202. The read/write head 204 may read information from the disk 202 by sensing a magnetic field formed on portions of the surface of the disk, and may write information to the disk by magnetizing a portion of the surface of the disk. The read/write head 204 may be located at the distal end of an arm 206 that is rotated by an actuator 208, such as a voice-coil motor ("VCM"), in order to reposition the read/write head 204. The read/write head 204 may incorporate multiple components, including reader elements, such as magneto-resistive ("MR") readers, tunneling MR readers, or the like; writer elements; writer shields; head heaters; sliders; and the like.

The storage device 200 may further comprise a controller 220 that controls the operations of the storage device. The controller 220 may include a processor 222. The processor 222 may implement an interface 224 allowing the storage device 200 to communicate with a host device, other parts of the storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transferring the formatted data via a read/write channel 226 through the read/write head 204 and to the surface of the disk 202. The processor 222 may further process read commands from the host device by determining the location of the desired data on the surface of the disk 202, positioning the read/write head(s) 204 over the determined location, reading the data from the surface of the disk via the read/write channel 226, correcting any errors and formatting the data for transfer to the host device. The read/write head 204 may be positioned to read or write data to one or more locations on a target data track 302 on the on the recording surface of the disk 202 by moving the read/write head 204 radially across the tracks using the actuator 208 while a spindle motor rotates the disk to bring the target location(s) under the read/write head.

The read/write channel 226 may convert data between the digital signals processed by the processor 222 and the analog read and write signals conducted through the read/write head 204 for reading and writing data to the surface of the disk 202. The analog signals to and from the read/write head 204 may be further processed through a pre-amplifier circuit. The read/write channel 226 may further provide servo data read from the disk 202 to a servo system 228. The servo system 228 may utilize the servo data from the read/write channel 226 along with reference signals from the processor to position the read/write head 204 over a target data track 302 and maintain the position of the head substantially over the center of the target track throughout a read or write operation. The servo system 228 may comprise hardware circuits in the controller 220, processor-executable instructions for execution in the processor 222, or any combination of these and other components of the storage device 200.

Figure 4:
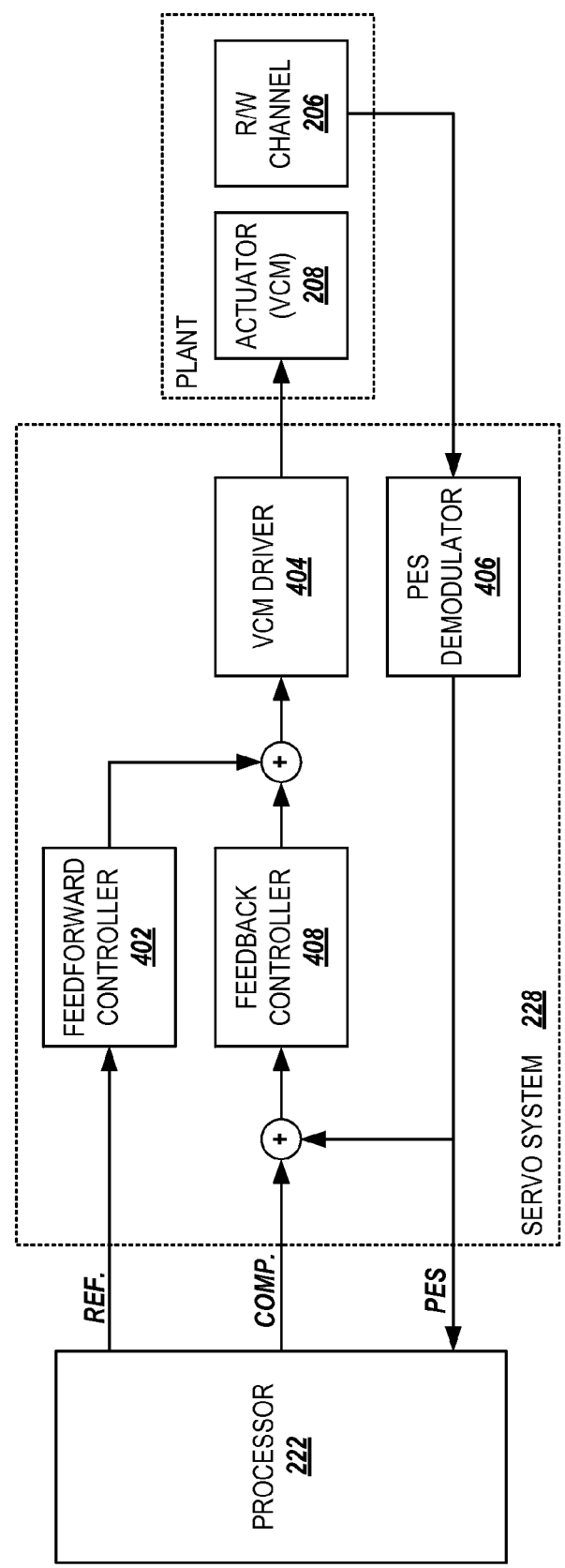
FIG. 4 is a block diagram showing additional details of a servo system in a storage device, according to embodiments described herein.

FIG. 4 shows additional details of a servo system 228 of an illustrative HDD apparatus, according to some embodiments. The processor 222 may provide a reference signal to a feedforward controller 402 that indicates the position of the target data track 302 on the recording surface of the disk 202. The feedforward controller 402 then provides the necessary signal to a VCM driver 404 that causes the actuator 208 to rotate such that the read/write head 204 is positioned over the target data track 302. During the read or write operation, the read/write head 204 reads the servo data written to recording medium and produces a position error signal ("PES"). The servo system 228 receives the PES from the read/write channel 206 and processes the signal using a PES demodulator 406 to produce PES information. The PES information may include values indicating a displacement of the head from the center of a virtual servo track. It will be appreciated that the servo tracks and the data tracks 302 used for writing and reading user data may not be the same.

The PES information is provided to a feedback controller 408 which adjusts the signal to the VCM driver 404 in order to keep the read/write head 204 substantially aligned with the center of the target data track 302. According to embodiments provided herein, the processor 222 may also provide compensation values to the feedback controller 408 for further controlling the alignment of the read/write head 204 during the read or write operation. Additionally, the PES information is provided to the processor 222 for processing and storing, as will be described in more detail below in regard to FIG. 6.

The controller 220 may further include a computer-readable recording medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 230 may further comprise a portion of the storage media of the storage device 200, such as the maintenance cylinder ("M/C") of the disk 202. For example, the memory 230 may store a firmware that comprises commands and data necessary for performing the operations of the storage device 200. In some embodiments, the memory 230 may be utilized to store the PES information recorded from the write of a data track 302 to the recording medium. According to further embodiments, the memory 230 may store processor-executable instructions that, when executed by the processor, perform the routines 100 and 600 for preventing adjacent track erasure in the storage device 200 using position error signal compensation, as described herein.

In addition to the memory 230, the environment may include other computer-readable media storing program modules, data structures, and other data described herein for preventing adjacent track erasure in a storage device using position error signal compensation. It will be appreciated by those skilled in the art that computer-readable media can be any available media that may be accessed by the controller 220 or other computing system for the non-transitory storage of information. Computer-readable media includes volatile and non-volatile, removable and non-removable recording media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

It will be appreciated that the structure and/or functionality of the storage device 200 may be different than that illustrated in FIGS. 2 and 4 and described herein. For example, the processor 222, read/write channel 226, servo system 228, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in the FIGS. 2 and 4, may include other components that are not explicitly shown in the figures or may utilize an architecture completely different than that shown in the figures.

FIGS. 5A and 5B show additional details of adjacent track erasure and its prevention using position error signal compensation in an SMR band write, according to embodiments described herein. Generally, during a write operation of a data track 302, the servo system 228 utilizes the PES information to keep the read/write 204 substantially at the center of the target track while writing the data. However, if the storage device 200 is subject to an external vibration or the servo data is flawed in some way, the data track 302 may be written in a non-uniform fashion. For example, as shown in FIG. 5A, a first data track N 302A of the band write may be written with some deviation of the read/write 204 from the ideal center of the track due to RRO, external shocks or vibrations during the write, and/or the like. When the second, partially overlapping data track N+1 302B in the SMR band is written, a portion of the first data track N 302A may be damaged or erased due to the non-uniformity of the written track, as shown at 502. Similarly the write of the third data track N+2 302C may damage or erase a portion of the second data track N 302B due to similar non-uniformities, as shown at 504.

According to the embodiments described herein, the processor 222 may record the PES information during the write of the first data track N 302A in the SMR band, and utilize this information to provide compensation values to the servo system 228 during the write of the second data track N+1 in order to control the position of the read/write head 204 such that the data written to the second track N+1 does not encroach on the data written to the first track N, as shown at 506 in FIG. 5B. Thus adjacent track erasure may be avoided. Similarly, the processor 222 may use the PES information recorded during the write of the second data track N+1 302B to provide compensation values to the servo system 228 during the write of the third data track N+2 302C in order to prevent erasure or damage to the data in the second track N+1, as shown at 508. In some embodiments, the processor 222 may use the PES information recorded during the writes of both the first data track N 302A and the second data track N+1 302B to determine the compensation values utilized in writing the third data track N+2 302C.

Figure 6:
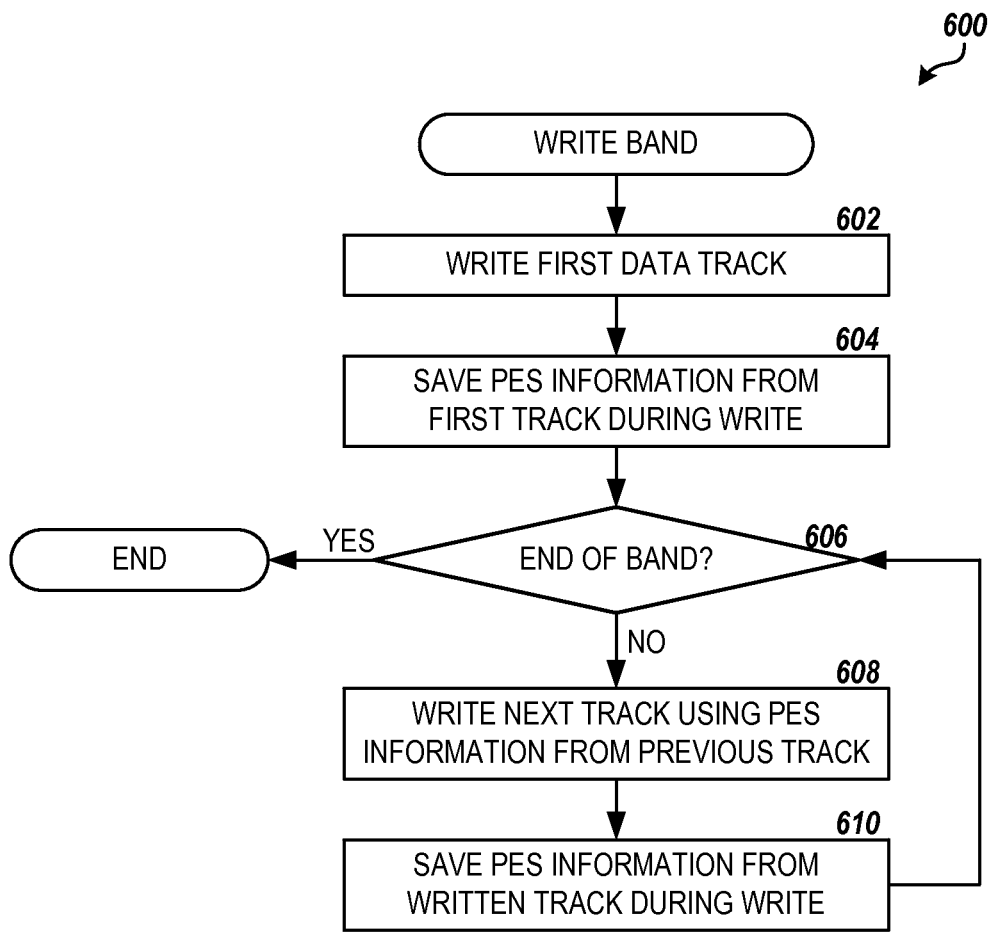
FIG. 6 is a flow diagram showing another routine for preventing adjacent track erasure in a storage device during a shingled magnetic recording band write using the position error signal information from previously written tracks, according to embodiments described herein.

FIG. 6 illustrates one routine 600 for preventing adjacent track erasure in a storage device during an SMR band write, according to embodiments described herein. In an SMR band write, two or more entire data tracks 302 are written sequentially in a partially overlapping fashion, allowing for increased areal storage density on the recording media. The routine 600 may be performed by the controller 220 of a storage device 200 implementing the embodiments described herein. In further embodiments, the routine 600 may be performed by some other combination of systems, processors and devices.

The routine 600 begins at step 602, where a first data track N 302A of the band is written to the recording media. As described above, the servo system 228 of the controller will utilize the PES to attempt to keep the read/write head 204 substantially aligned with the center of the track. However, if the storage device 200 is subject to an external vibration or the servo data is flawed in some way, the first data track N 302A may be written in a non-uniform fashion. This track non-uniformity ("TNU") should be reflected in the PES received from the read/write channel 226. Next, at step 604 PES information from the write of the first data track N 302A is saved by the processor 222. For example, the processor 222 may store the PES information in the memory 230 of the controller 220. In some embodiments, the PES information may comprise values for position error, write bump usage, and the like decoded from the PES by the servo system 228 and/or the processor 222.

From step 604, the routine 600 proceeds to step 606, where it is determined whether the last track in the band has been written. If the last track has not been written, the routine 600 proceeds to step 608, where the next data track in the band, such as such as the second data track N+1 302B, is written to the recording medium. According to embodiments, the controller 220 uses the PES information recorded from the previous track, in this case data track N 302A, to compensate for track uniformities in the previous written track while writing the next track in order to avoid adjacent track erasure. For example, the processor 222 may retrieve the PES information from the previous track from the memory 230 and calculate compensation values that are provided to the servo system 228 to control the alignment of the read/write head 204 while writing the next track.

In some embodiments, the compensation values are indicative of the amount of deviation of the read/write head 204 from the ideal center of the track when writing the previous track. The compensation values may be adjusted by a weighting factor, such as 0.5, to produce a smaller corresponding compensation in the next track from the previous track. In further embodiments, the compensation values may only reflect deviations of the read/write head 204 during the write of the previous track that were in the direction of the next track, i.e. positive deviations but not negative deviations. In additional embodiments, the controller 220 may utilize information PES information from 2 or more previous tracks when writing the next track to avoid adjacent track erasure.

The routine 600 proceeds from step 608 to step 610 where the processor saves the PES information from the write of the next track in the memory 230. From step 610, the routine 600 returns to step 606 where the steps are repeated until the last track in the band has been written. Once all tracks in the SMR band write have been written to the recording medium, the routine 600 then ends.

Based on the foregoing, it will be appreciated that technologies for preventing adjacent track erasure in a storage device using position error signal compensation from a previously written track are presented herein. While embodiments are described herein in regard to an HDD apparatus, it will also be appreciated that the embodiments described in this disclosure may be utilized by any storage device implementing a servo system similar to that described above. This may include a magnetic disk drive, a hybrid magnetic and solid state drive, a magnetic tape drive, an optical disk drive, and the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
    writing data to a first data track on a recording medium in a storage device;
    recording position error signal information while writing the first data track, the position error signal information regarding deviations of a read/write head from an ideal center of the first data track; and
    writing data to a second data track on the recording medium using compensation values for a servo mechanism in the storage device generated from the recorded position error signal information to position the read/write head, the second data track being adjacent to the first data track, wherein only compensation values reflecting positive deviation of the read/write head from the first track towards the second track are used in positioning the read/write head while writing the second track and wherein the compensation values are adjusted by a weighting factor to produce a smaller corresponding compensation in the read/write head while writing the second track.

2. The method of claim 1, wherein the position error signal information is received from the servo mechanism in the storage device.

3. The method of claim 1, wherein the position error signal information comprises a position error determined from a signal generated by servo data written to the recording medium.

4. The method of claim 1, wherein the first and second data tracks are in a same shingled magnetic recording band.

5. The method of claim 1, wherein the storage device is a hard-disk drive apparatus.

6. A storage device comprising:
    a servo system for controlling an alignment of a read/write head with a target data track on a recording medium;
    a memory; and
    a processor operably connected to the memory and the servo system and configured to
        write a first data track to the recording medium,
        receive position error signal information from the servo system while writing the first data track, the position error signal information regarding deviations of the read/write head from an ideal center of the first data track,
        store the position error signal information in the memory,
        generate compensation values from the stored position error signal information to be utilized by the servo system during the write of a next data track, the compensation values being limited to only those compensation values reflecting positive deviations of the read/write head from the first data track towards the next data track and being adjusted by a weighting factor to produce smaller corresponding deviations in the read/write head while writing the next data track; and
        writing the next data track to the recording medium using the compensation values to compensate for non-uniformity in the writing of the first data track, the next data track being adjacent to the first data track.

7. The storage device of claim 6, wherein the position error signal information comprises a position error determined from a signal generated by servo data written to the recording medium.

8. The storage device of claim 6, wherein the first data track and the next data track are in a same shingled magnetic recording band.

9. The storage device of claim 6, wherein the processor is further configured to generate the compensation values utilizing position error signal information from the write of a plurality of previous adjacent data tracks.

10. A non-transitory computer-readable medium having processor-executable instructions that, when executed by a processor in a storage device, cause the processor to:
   write a first data track in a shingle magnetic recording ("SMR") band to a recording medium of the storage device;
   record position error signal information while writing the first data track, the position error signal information regarding deviations of a read/write head from an ideal center of the first data track on the recording medium;
   generate compensation values from the recorded position error signal information to be utilized by a servo mechanism in the storage device during the writing of a next data track in the SMR band; and
   write the next data track to the recording medium using the generated compensation values to position the read/write head, wherein only compensation values reflecting positive deviation of the read/write head from the first data track towards the next data track are used in positioning the read/write head while writing the next data track and wherein the compensation values are adjusted by a weighting factor to produce a smaller corresponding compensation in the read/write head while writing the next data track.

11. The computer-readable medium of claim 10, having further processor-executable instructions that cause the processor to write the remaining data tracks in the SMR band to the recording medium using the recorded position error signal information from the previous track to position the read/write head.

12. The computer-readable medium of claim 10, wherein the position error signal information is received from the servo mechanism in the storage device.

* * * * *